United States Patent [19]

Glass

[11] 4,221,051
[45] Sep. 9, 1980

[54] CIRCULAR SAW WITH IMPROVED BASE PLATE ADJUSTMENT

[75] Inventor: James L. Glass, Liberty, S.C.

[73] Assignee: The Singer Company, Stamford, Conn.

[21] Appl. No.: 43,778

[22] Filed: May 30, 1979

[51] Int. Cl.³ .............................................. B27B 9/00
[52] U.S. Cl. .................................................... 30/377
[58] Field of Search .................. 30/374, 375, 376, 377

[56] References Cited

U.S. PATENT DOCUMENTS

| | | | |
|---|---|---|---|
| 1,623,290 | 4/1927 | Wappat | 30/377 |
| 1,708,345 | 4/1929 | Wodack | 30/377 |
| 1,803,068 | 4/1931 | McKeage | 30/377 |
| 3,292,673 | 12/1966 | Gregory | 30/377 |
| 3,447,577 | 6/1969 | Burrows | 30/377 |

*Primary Examiner*—Jimmy C. Peters

*Attorney, Agent, or Firm*—Elliot A. Lackenbach; Edward L. Bell; Robert E. Smith

[57] ABSTRACT

A portable, power operated circular saw having a housing or frame and a base plate pivotally connected at its forward end to the saw housing or frame for swinging movement about an axis parallel the axis of rotation of the blade mounting shaft is provided with new and improved base plate inclination adjustment means comprising an adjustment arm having an elongated arcuate portion provided with an elongated arcuate slot generally concentric the pivotal axis of the base plate and a clamping member extending through the arcuate slot for clamping the adjustment arm selectively at a fixed position relative the saw housing or frame, the clamping member being actuated by relative rotation between a pair of camming members having opposed cooperating interacting inclined ramps or cam surfaces, at least one of the cam members being adapted to be rotated by an operating lever.

6 Claims, 7 Drawing Figures

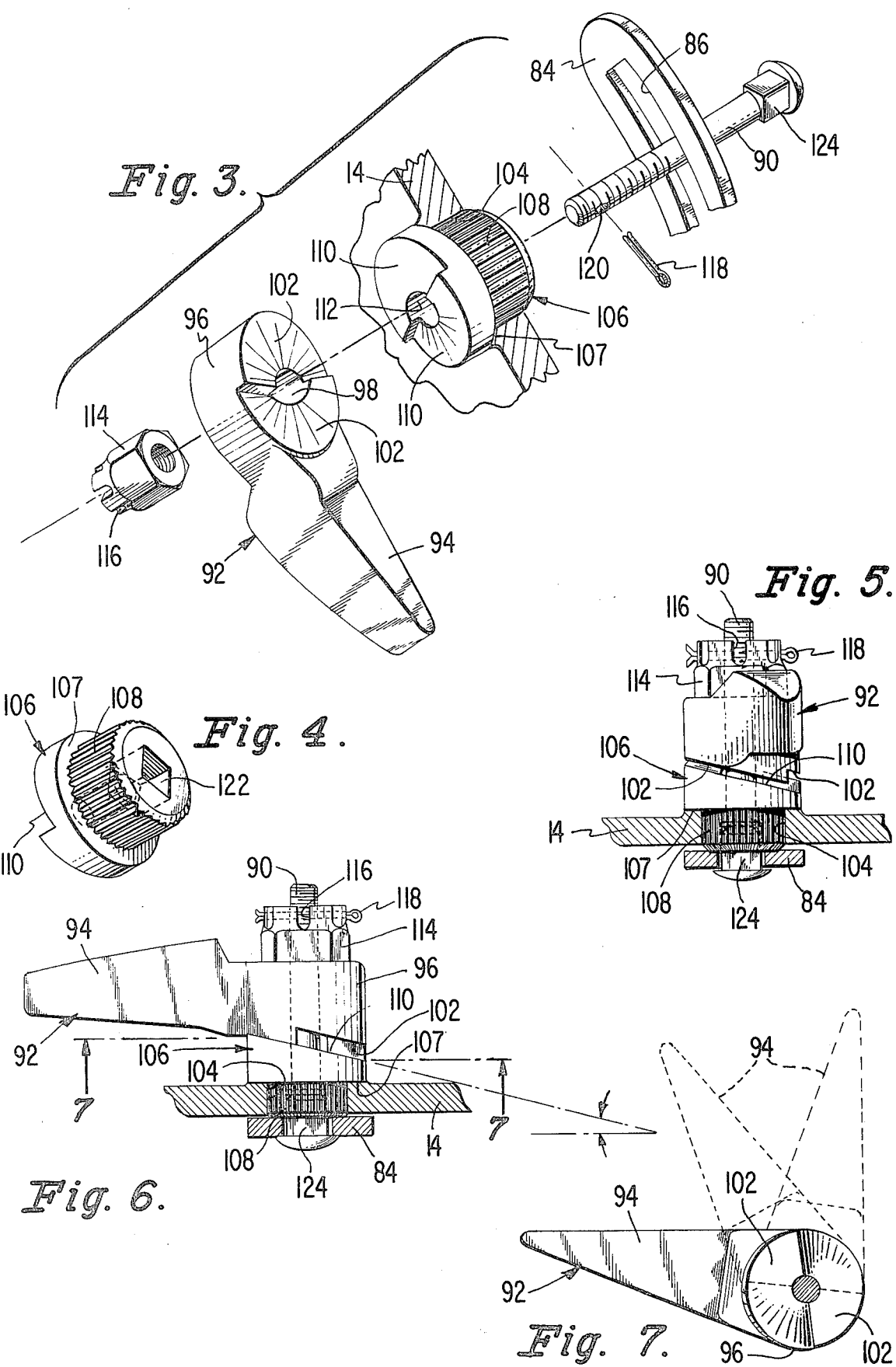

CIRCULAR SAW WITH IMPROVED BASE PLATE ADJUSTMENT

BACKGROUND OF THE INVENTION

1. Field of the Invention

This invention relates to portable, power operated circular saws and, more particularly to new and improved mechanisms for adjustment of the base plate of such saws.

2. Brief Description of the Prior Art

It is known in the prior art to provide a circular saw with an adjustable base plate. Such plate is pivotally connected at its forward end to the saw housing or frame for swinging movement about an axis parallel the axis of rotation of the blade mounting shaft. The base plate may be adjustably mounted in any desired position between a so-called normal position and a position inclined with respect thereto. The base plate may also be mounted by adjustment means for pivotal movement about its longitudinal axis to perform bevel sawing.

Circular saws of this type have been provided with adjustment means for enabling the operator to selectively lock the adjustable base plate in the desired normal or inclined position to achieve the desired depth of cut.

OBJECTS OF THE INVENTION

Bearing in mind the foregoing, it is a primary object of the present invention to provide new and improved mechanisms for enabling operator adjustment of a circular saw base plate between a so-called normal position and a position inclined relative thereto.

Another primary object of the present invention, in addition to the foregoing object, is the provision of a portable, power operated circular saw of the type described, which saw embodies new and improved base plate adjustment mechanism.

Yet another primary object of the present invention, in addition to each of the foregoing objects, is the provision, in circular saws of the class described, of new and improved base plate adjustment mechanism which is economical to manufacture and assemble, which is convenient and effective for enabling operator adjustment of the base plate position, and which is durable and efficient in use.

Yet still another primary object of the present invention, in addition to each of the foregoing objects, is the provision of novel and improved base plate position adjusting means comprising cooperating cam surfaces to enabling relatively long movement of a clamping bolt by means of a relatively short arcuate movement of an operating lever.

The invention resides in the combination, construction, arrangement and disposition of the various component parts and elements incorporated in improved circular saws and in base plate adjustment mechanism therefor in accordance with the principles of this invention. The present invention will be better understood and objects and important features other than those specifically enumerated above will become apparent when consideration is given to the following details and description which, when taken in conjunction with the annexed drawing describes, discloses, illustrates and shows a preferred embodiment or modification of the present invention and what is presently considered and believed to be the best mode of practicing the principles thereof. Other embodiments and modifications may be suggested to those having the benefit of the teachings herein, and such other embodiments or modifications are intended to be reserved, especially as they fall within the scope and spirit of the subjoined claims.

SUMMARY OF THE INVENTION

In accordance with the present invention, a portable, power operated circular saw having a housing or frame and a base plate pivotally connected at its forward end to the saw housing or frame for swinging movement about an axis parallel the axis of rotation of the blade mounting shaft is provided with new and improved base plate inclination adjustment means comprising an adjustment arm having an elongated arcuate portion provided with an elongated arcuate slot generally concentric the pivotal axis of the base plate and a clamping member extending through the arcuate slot for clamping the adjustment arm selectively at a fixed position relative the saw housing or frame, the clamping member being actuated by relative rotation between a pair of camming members having opposed cooperating interacting inclined ramps or cam surfaces, at least one of the cam members being adapted to be rotated by an operating lever.

BRIEF DESCRIPTION OF THE DRAWING

While the specification concludes with claims particularly pointing out and distinctly claiming the subject matter which is regarded as forming the present invention, it is believed the invention will be better understood from the following details and description when taken in conjunction with the annexed drawing which discloses, illustrates and shows a preferred embodiment or modification of the present invention and what is presently considered and believed to be the best mode of practicing the principles thereof and wherein:

FIG. 3 is a perspective exploded view of the adjustment mechanism incorporated in the saw of the preceding figures;

FIG. 4 is a perspective illustration of the cam member utilized in the adjustment mechanism;

FIG. 5 is an enlarged plan illustration, partially in section, of the adjustment mechanism in the unlocked position thereof enabling operator movement of the circular saw base plate between the so-called normal and an inclined position relative thereto;

FIG. 6 is a plan illustration similar to FIG. 5 showing the adjustment mechanism in the locked or clamped position thereof retaining the base plate in a specific angular orientation or inclination; and FIG. 7 is a cross-sectional illustration taken generally along the line 7—7 of FIG. 6 illustrating the range of movement of the operating lever in moving between the positions of FIG. 5 and FIG. 6.

DETAILED DESCRIPTION THE INVENTION

Figure 1:
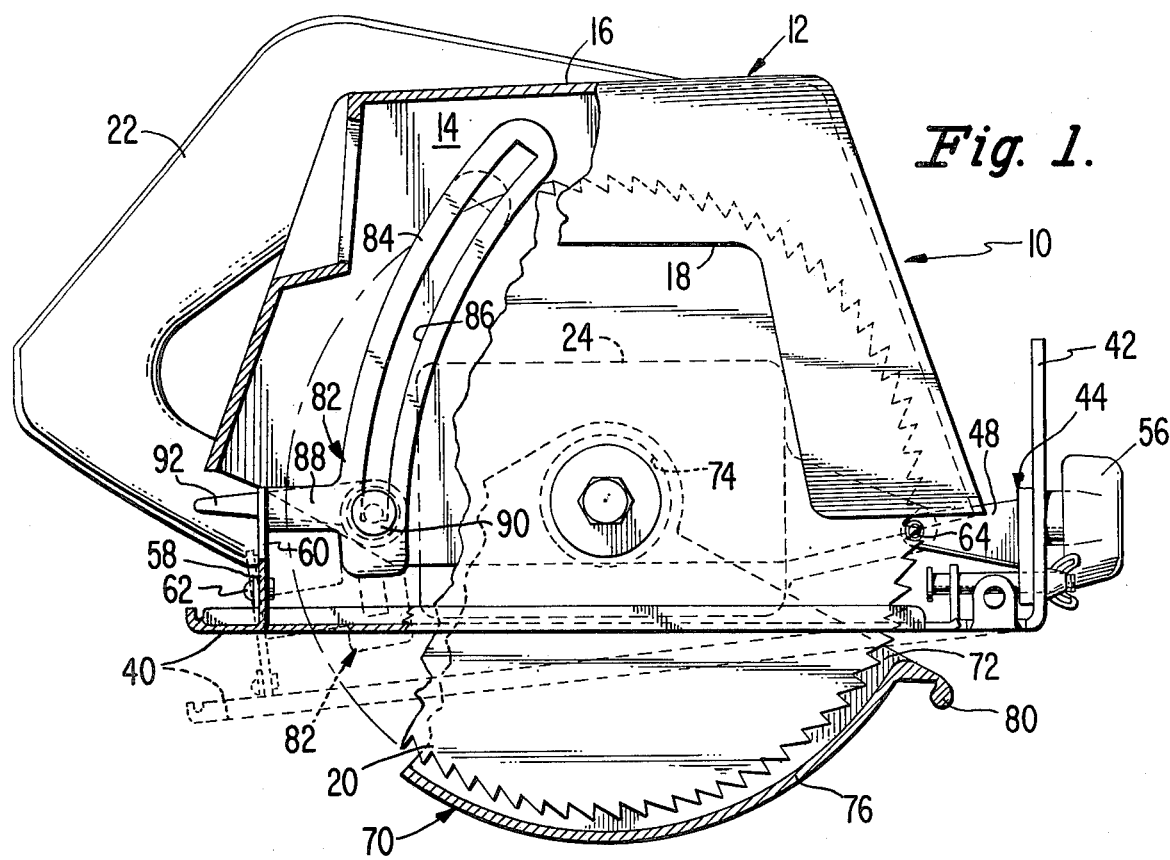
FIG. 1 is a side elevational view, partially broken away, of a circular saw having base plate adjustment mechanism constructed in accordance with the principles of the present invention.
Figure 2:
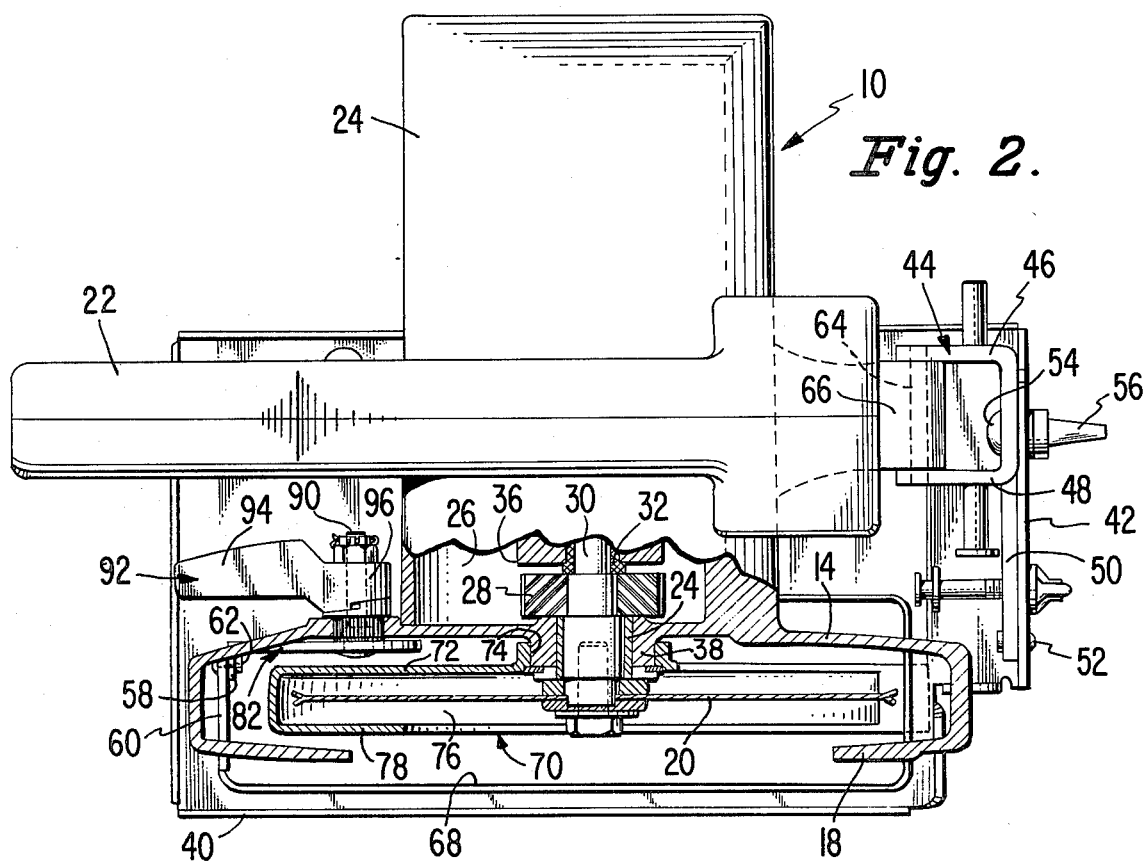
FIG. 2 is a top plan view, partially broken away, of the circular saw of FIG. 1.

With reference now to the drawing, there is shown and illustrated a portable, power operated circular saw, generally designated by the reference character 10, which embodies the present invention. The saw 10 comprises a frame or housing 12 of integral, one piece construction defining a fixed upper blade guard formed of a generally trapezoidal supporting plate 14, an integral angulated web 16, and an integral generally concamerated flange 18. This plate, web and flange cooperate to enclose the teeth on the upper portion of a circular saw blade 20.

The frame 12 supports the usual handle 22. The frame also supports a motor housing or cover 24 defining a space 26 containing the operating mechanism for rotating the circular saw blade 20. The operating mechanism for rotating the circular saw blade 20 may be of any desired construction and may include, for example, an electric motor having an armature shaft driving a pinion gear (not shown) engaged with a driven gear 28. This driven gear 28 is mounted on a shaft 30, which shaft 30 is supported for rotation in inner and outer bearings 32 and 34, respectively, carried by bosses 36 and 38 supported by frame 12.

A generally rectangular, generally planar adjustable base plate 40 has an upwardly extending nose plate 42 at the forward end thereof. A mounting bracket 44 is provided having a U-shaped or forked portion comprising a pair of generally parallel, spaced apart bifurcations 46 and 48 and a transverse leg 50 generally coplanar with the base of the bifurcations. The nose plate 42 is pivotally connected with the transverse leg 50, as by a rivet 52. Adjustment means, such as a threaded fastener 54 and wing nut 56 enable the base plate 40 to be pivoted relative the bracket 44, the nose plate 42 being provided with an arcuate slot (not shown) through which the threaded fastener 54 extends, as will be appreciated by those having skill in the art.

The rearward portion of the base plate 40 is also provided with a generally upstanding bracket plate 58 pivotally attached to a bracket arm 60, as by means of a rivet 62 in axial alignment with the rivet 52. Hence, the base plate is mounted for adjustable pivoting movement about its longitudinal axis to perform bevel sawing.

The bracket 44 is, in turn, pivotally mounted to the frame 12, as by a pivot pin 64 extending through a boss 66 provided on the frame 12 and into the ends of the bifurcations 46 and 48 in generally parallel relationship with the blade mounting shaft 30, thereby mounting the base plate 40 for swinging movement back and forth between a normal position, shown in solid lines in FIG. 1, and an inclined position shown in broken lines in that figure of the drawing.

The base plate 40 includes an elongated slot 68 for receiving a portion of the circular saw blade 20 therethrough. A lower blade guard, generally designated by the reference character 70, includes a plate 72 having a circular opening 74 for rotatably mounting the lower blade guard 70 on an external bearing surface of the boss 38, the latter being concentric with the blade mounting shaft 30 for rotation of the lower blade guard about such shaft. The lower blade guard 70 further includes an arcuate web 76 integral with the plate 72 and an arcuately extending flange 78 which in turn is integral with the web 76. The lower blade guard 70 is biased by a spring, not shown, towards a closed position thereof with the rearward portion being nested within the rearward portion of the upper blade guard. In such closed position the lower blade guard cooperates with the upper blade guard to enclose substantially all of the teeth of the circular saw blade 20—only a few teeth between the base plate 40 and the work engaging forward end 80 of the lower blade guard are exposed. In cutting a workpiece, the blade guard will be rotated (clockwise as seen in FIG. 1) from its closed position towards its open or retracted position by engagement of the work engaging end 80 thereof against the workpiece.

The bracket arm 60, to which the base plate 40 is pivotally mounted by the rivet 62 for pivoting movement about the longitudinal axis is, in turn, integrally formed as a lateral extension of an adjustment arm, designated generally by the reference character 82 which, together with novel and improved clamping means according to the present invention enables the pivoting movement and pivotal orientation of the base plate 40 about the forward pivot pin 64 to be controlled by the operator. The adjustment arm 82 comprises an arcuate elongated portion 84 extending generally parallel the plane of the blade 20 and is provided with an elongated, generally arcuate slot 86 generally concentric the pivot pin 64. An intermediate connecting arm 88 extends between the lower end portion of the arcuate elongated portion 84 and the bracket arm 60.

The fixed blade guard, particularly the rear trapazoidal plate 14 thereof is provided with an aperture through which an elongated clamping member, such as a carriage bolt 90 extends, as well as being extended through the arcuate slot 86, to enable the arcuate elongated portion 84 of the adjustment arm 82 to be selectively tightly clamped to prevent movement thereof relative the fixed blade guard plate 14 locking the base plate 40 in a desired orientation, either the so-called normal position or a position inclined relative thereto or unclamped, enabling sliding movement of the arcuate elongated position 84 of the adjustment arm 82 relative the carriage bolt 90 and enabling operator adjustment or movement of the base plate 42 to or from the normal or inclined position thereof. In accordance with the present invention camming means are utilized to draw the carriage bolt and adjustment arm towards the fixed blade guard for clamping of the adjustment arm 82 and for releasing the carriage bolt from tension, thereby releasing the adjustment arm from clamping engagement for movement of the adjustment arm 82. In accordance herewith, the camming means comprises a locking lever designated generally by the reference character 92 having an operating handle 94 and a generally cylindrical head 96 provided with a generally central aperture or bore 98 through which the shank of the carriage bolt 90 may pass and at least one, and preferably two inclined ramp or cam surfaces 102 extending generally annularly around the aperture 98. Preferably, two inclined ramp or cam surfaces are provided, extending in the same direction providing an incline of about 0.001 inch rise per 3 degrees of angular rotation. With two such surfaces, each subtending 180 degrees, a 0.060 inch total rise is achieved.

The locking lever camming surfaces 102 cooperate with mating annual inclined ramp or cam surfaces provided on the fixed blade guard plate 14. Such annular inclined ramp or cam surfaces may be provided integral on the fixed blade guard plate 14 with an aperture extending generally axially therethrough for the clamping member or carriage bolt 90 or, as shown, the fixed blade guard plate 14 may be provided with an enlarged aperture 104 into which a mushroom headed cam bush 106 may be press fit. The bush 106 may be provided with serrations 108 to retain the bush relative the fixed blade guard plate 14. The mushroom head of the bush 106 is provided on the surface thereof opposite the bush shoulder 107 with at least one, and preferably two inclined annular ramp or cam surfaces 110 complementary the surfaces 102 on the locking lever 92. Since, in the preferred embodiment, each of the cam ramps 102 and 110 rises 0.060 inches in 180 degrees of angular change in position, this combination enables a 0.060 inch rise of the locking lever 92 relative the bush 106 in only 90 degrees rotation of the locking lever. The bush 106 is provided with an axial bore or aperture 112, enabling the carriage bolt 90 to be passed therethrough.

The rise of the locking lever 92 relative the bush 106 is transfered into a pull on the carriage bolt 90 by means of a nut 114 engaged with the threads of the carriage bolt 90 outside the locking lever 92. Preferably, the nut 114 is of a locking variety, most preferably comprising a castellated nut having a plurality of slots 116, enabling it to be locked to the carriage bolt 90, as by means of a cotter pin 118 passing through a transverse aperture 120 provided through the carriage bolt 90 so that the ends of the cotter pin 118 engage an opposed pair of the slots 116 of the castellated nut 114. Finally, the bush 106 is provided with a square counterbore 122 whose center is aligned with the axis of the aperture 112 so that the square shoulder 124 of the carriage bolt 90 engages the sides of the arcuate slot 86 and the square counterbore 122 to prevent rotation.

As heretofore pointed out, the ramps or inclines 102 and 110, in a preferred embodiment or modification each provide a rise of 0.060 inches, with such rise being generated over 180 degrees of position change. Since the ramps or inclined surfaces 102 and 110 cooperate with one another, however, over 180 degrees of relative rotation, a total rise of 0.120 inches would be generated. Accordingly, in accordance with the preferred embodiment, a rise of 0.060 inches can be generated in only 90 degrees of relative rotation. Assembly to provide such desired 0.060 inch rise in 90 degrees of rotation can, utilizing the component parts of the present invention, be readily achieved, without requiring the use of jigs, fixtures, or the like to properly align the cooperating ramp surfaces while positioning the locking lever to be generally movable between a vertical and a horizontal orientation corresponding to two extremes of its movement in locking and unlocking the adjustment mechanism, respectively. To achieve this, the bush 106 is press fit into the guard with the shoulders 109 at the end of te inclined ramp surfaces generally parallel the base plate 40 when in its normal position. Then, if the carriage bolt is inserted, and the locking lever 92 assembled therewith in a position intermediate and bisecting the angle between the desired locked or clamped and unlocked or unclamped positions, and the lock nut 114 assembled therewith to a "hand tight" position and the cotter pin installed, the desired 0.060 inch raise will occur without overrunning the cam surfaces and the clamping lever will swing approximately equally in each direction about the assembled "hand tight" position. If the mechanism is assembled with the clamping handle tilted to about 45 degrees from the horizontal, than in use the clamping handle will be pivotal generally between a vertical and an horizontal orientation. The change in configuration between the unlocked or unclamped position and the clamped or locked position is shown in FIGS. 5 and 6. In FIG. 5, the locking lever has been rotated clockwise to a position whereat the shoulders 109 at the ends of the ramps 102 and 110 are approaching abutment and, accordingly, the ramp surfaces 102 and 110 are, as shown, spaced apart to define a gap therebetween and providing free play for the carriage bolt 90 and enabling the base plate 40 to be moved. In FIG. 6, the clamping lever 92 has been rotated and the camming surfaces 102 and 110 engaged tightly one against the other, pulling the carriage bolt 90 and clamping the arcuate elongated portion 84 of the adjustment arm 82 against, for example, the end of the bush 106 to lock the base plate 40 in position.

In FIG. 7, the clamping lever 92 is shown in solid lines in its clamping position and, in dotted lines in the intermediate, assembly position and the unlocked position, respectively.

While the invention has been described, disclosed, illustrated and shown in terms of certain embodiments or modifications herein described, disclosed, illustrated or shown, such other embodiments or modifications as may be suggested to those having the benefit of the teachings herein are intended to be reserved, especially as they fall within the scope and breadth of the claims here appended.

I claim:

1. In a portable, power operated circular saw having a housing or frame and a base plate pivotally connected at its forward end to the saw housing or frame for swinging movement about an axis parallel the axis of rotation of the blade mounting shaft, base plate inclination adjustment means comprising an adjustment arm having an elongated arcuate portion provided with an elongated arcuate slot generally concentric the pivotal axis of the base plate and a clamping member extending through the arcuate slot for clamping the adjustment arm selectively at a fixed position relative the saw housing or frame, the clamping member being actuated by relative rotation between a pair of camming members having opposed cooperating interacting inclined ramps or cam surfaces, at least one of the cam members being adapted to be rotated by an operating lever.

2. Portable, power operated circular saw defined in claim 1 wherein said at least one cam member comprises an operating handle and a generally cylindrical head provided with a generally central bore through which the clamping member extends and at least one inclined ramp cam surface extending annularly around said bore.

3. Portable, power operated circular saw defined in claim 2 wherein said clamping member comprises a bolt, a nut being threaded on said bolt behind said cam member whereby rise of said cam member bears against said nut to pull on said bolt whereby said bolt clamps said arm against movement relative said housing or frame.

4. Portable, power operated circular saw defined in any of claims 1, 2 or 3 wherein said other of said camming members comprises a mushroom headed bush carried by said housing or frame having a central bore therethrough through which said clamping member passes, said mushroom headed bush having an inclined ramp cam surface extending annularly around said bore.

5. Portable, power operated circular saw defined in claim 4 wherein said inclined ramp cam surfaces are complementary.

6. Portable, power operated circular saw defined in any of claims 1, 2, 3, 4 or 5 wherein said inclined ramp cam surfaces each subtend about 180 degrees whereby 90 degrees of relative rotation therebetween provides a rise equal to the total rise of one of said ramp cam surface.

* * * * *